US009156977B2

(12) United States Patent
Faatz et al.

(10) Patent No.: US 9,156,977 B2
(45) Date of Patent: Oct. 13, 2015

(54) PROCESS FOR PRODUCING PROTECTIVE COLLOID-STABILIZED POLYMERS

(75) Inventors: Michael Faatz, Burghausen (DE); Reinhard Haerzschel, Burghausen (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 14/119,917

(22) PCT Filed: Apr. 27, 2012

(86) PCT No.: PCT/EP2012/057775
§ 371 (c)(1),
(2), (4) Date: Nov. 25, 2013

(87) PCT Pub. No.: WO2012/159848
PCT Pub. Date: Nov. 29, 2012

(65) Prior Publication Data
US 2014/0094542 A1 Apr. 3, 2014

(30) Foreign Application Priority Data
May 24, 2011 (DE) .......................... 10 2011 076 407

(51) Int. Cl.
C08L 33/12 (2006.01)
C08F 2/30 (2006.01)
C08F 220/18 (2006.01)
C04B 24/26 (2006.01)
C08F 2/16 (2006.01)
C08F 218/04 (2006.01)
C08L 51/00 (2006.01)
C08F 2/24 (2006.01)

(52) U.S. Cl.
CPC ............. C08L 33/12 (2013.01); C04B 24/2641 (2013.01); C08F 2/30 (2013.01); C08F 220/18 (2013.01); C08F 2/16 (2013.01); C08F 2/24 (2013.01); C08F 218/04 (2013.01); C08L 51/003 (2013.01)

(58) Field of Classification Search
CPC ............ C08L 51/003; C08F 2/24; C08F 2/16; C08F 218/04
USPC .......................................................... 524/803
See application file for complete search history.

(56) References Cited

U.S. PATENT DOCUMENTS

| 5,089,570 | A | * | 2/1992 | Rauterkus et al. | ............ 525/455 |
| 5,118,751 | A | * | 6/1992 | Schulze et al. | ................ 524/503 |
| 5,567,750 | A | * | 10/1996 | Schulze et al. | .................... 524/3 |
| 5,741,871 | A | * | 4/1998 | Bott et al. | ..................... 526/202 |
| 5,753,036 | A | * | 5/1998 | Hornaman et al. | ........... 106/810 |
| 5,959,029 | A | | 9/1999 | Koelliker et al. | |
| 6,300,403 | B1 | * | 10/2001 | Mayer et al. | .................... 524/459 |
| 6,605,663 | B1 | * | 8/2003 | Weitzel | .......................... 524/459 |
| 6,706,805 | B2 | * | 3/2004 | Weitzel | .......................... 524/563 |
| 7,250,468 | B2 | * | 7/2007 | Harzschel et al. | ............ 524/803 |
| 8,217,109 | B2 | * | 7/2012 | Weitzel et al. | ................ 524/459 |
| 2001/0025078 | A1 | * | 9/2001 | Mayer et al. | .................... 524/459 |
| 2003/0125453 | A1 | * | 7/2003 | Triantafillopoulos et al. | ............................. 524/503 |
| 2004/0097645 | A1 | * | 5/2004 | Weitzel et al. | ................ 524/803 |
| 2004/0204518 | A1 | * | 10/2004 | Harzschel et al. | ................ 524/5 |
| 2006/0217484 | A1 | | 9/2006 | Tanimoto et al. | |
| 2007/0112117 | A1 | | 5/2007 | Weitzel | |
| 2007/0155862 | A1 | * | 7/2007 | Haerzschel et al. | ............. 524/5 |
| 2008/0081853 | A1 | | 4/2008 | Bacher et al. | |
| 2010/0029846 | A1 | | 2/2010 | Shibutani et al. | |
| 2010/0197853 | A1 | | 8/2010 | Sugaya | |
| 2010/0261830 | A1 | | 10/2010 | Shibutani et al. | |
| 2014/0094542 | A1 | * | 4/2014 | Faatz et al. | ........................ 524/5 |

FOREIGN PATENT DOCUMENTS

| CN | 1966533 A | 5/2007 |
| CN | 101031596 A | 9/2007 |
| DE | 1 026 074 A1 | 3/1958 |
| DE | 3 724 332 A1 | 2/1989 |
| DE | 10 2009 000 537 A1 | 8/2010 |
| EP | 0 477 900 A2 | 4/1992 |
| EP | 0 723 975 A1 | 7/1996 |
| EP | 0 812 863 A1 | 12/1997 |
| EP | 1 065 224 A1 | 1/2001 |
| EP | 1 110 979 A1 | 6/2001 |
| EP | 1 612 226 A1 | 1/2006 |
| EP | 2 033 991 A1 | 3/2009 |
| EP | 2 075 286 A1 | 7/2009 |
| EP | 2 166 028 A1 | 3/2010 |
| EP | 2 189 499 A1 | 5/2010 |
| EP | 2 216 348 A1 | 8/2010 |
| WO | 2010086217 A2 | 8/2010 |

OTHER PUBLICATIONS

English patent abstract for DE 10 2009 000 537 A1.
English patent abstract for DE 1 026 074 A.
English patent abstract for EP 2 075 286 A1.
English patent abstract for EP 2 189 499 A1.
English patent abstract for DE 3 724 332 A1.
Fox T. G., Bull. Am. Physics Soc. 1, 3, p. 123 (1956).
Polymer Handbook 2nd Edition, J. Wiley & Sons, New York (1975).
International Search Report for PCT/EP2012/057775 dated Jul. 5, 2012.
English patent abstract for WO 2010/086217 A2 (2010).

* cited by examiner

Primary Examiner — Michael Pepitone
Assistant Examiner — Michael A Salvitti
(74) Attorney, Agent, or Firm — Caesar Rivise, PC

(57) ABSTRACT

The invention relates to processes for producing protective colloid-stabilized polymers based on (meth)acrylate esters in the form of their aqueous dispersions and water-redispersible polymer powders by means of free-radically initiated emulsion polymerization of one or more monomers from the group consisting of the esters of acrylic acid or methacrylic acid and optionally one or more further monomers which are copolymerizable therewith, in the presence of one or more protective colloids, and optionally drying of the resulting aqueous dispersion, characterized in that the emulsion polymerization is carried out in the presence of one or more fully hydrolysed 1-alkylvinyl ester-vinyl ester copolymers as protective colloid.

20 Claims, No Drawings

PROCESS FOR PRODUCING PROTECTIVE COLLOID-STABILIZED POLYMERS

BACKGROUND OF THE INVENTION

The present invention relates to processes for preparing protective colloid-stabilized polymers on the basis of (meth) acrylate monomers in the form of their aqueous dispersions or polymer powders redispersible in water, to the process products thus obtainable, and to the use thereof, for example, as coating materials or adhesive-bonding materials in the construction sector.

Protective colloid-stabilized polymers are employed in particular in the form of their aqueous dispersions or polymer powders redispersible in water, in numerous applications, as for example in the building sector, as coating materials or adhesive-bonding materials. Very familiar for these applications are polymers based on vinyl esters and ethylene. Protective colloids widespread in the art to date have been, in particular, partly hydrolyzed polyvinyl alcohols. In contrast, polyvinyl alcohols as protective colloids for acrylate polymers or styrene-acrylate copolymers usually do not lead to sufficiently stable polymer dispersions. There are problems, therefore, in stabilizing acrylate dispersions solely with polyvinyl alcohols in such a way that the resulting dispersions are stable and the powders, moreover, are stable to blocking (polymer stability). Generally speaking, a manageable dispersion viscosity is obtained by additional use of chain transfer agents for lowering the molecular weight, which in turn considerably impairs the blocking stability of the powders.

A further problem is that the stabilization of dispersed or redispersed particles of the polymers subsides over the course of time as a result of partly hydrolyzed polyvinyl alcohols in cementitious construction compounds. This occurs particularly in the case of acrylate polymers and styrene-acrylate copolymers. Where protective colloid-stabilized polymers are employed to improve the properties of construction compounds, however, the formulations are required to remain stable for a certain time and must not substantially change in their processing consistency (stability of viscosity, or cement stability). Otherwise, the user is unable to produce buildings having the required performance properties, such as mechanical properties, from the construction compounds, or else the user would have to produce new construction compounds again and again within short time periods, something which in the art represents an unacceptable burden.

It has further been observed that when polymers stabilized with partly hydrolyzed polyvinyl alcohols are employed in cementitious construction compounds, the stabilization of air may subside over time, meaning that air may gradually escape from the cementitious construction compounds. This effect is also dubbed "gassing" and affects the air pore content of the cementitious construction compounds and of the buildings produced from them. The air pore content and the associated porosity, however, play a key part in the mechanical properties of concrete or mortar, such as the compressive strength, for example. Too many air pores, and the compressive strength plummets; too few air pores, or none, in the mortar or concrete, and the building material lacks sufficient freeze/thaw stability.

A number of approaches have already been presented before now to the production of protective colloid-stabilized polymers for construction applications. EP-A 1065224, for instance, advises —for the preparation of poly(meth)acrylic esters—polymerization in the presence of partly hydrolyzed polyvinyl alcohols, the monomers and initiators being divided in a specific way between the initial charge and the metered feed. EP-A 0477900 teaches the addition of fully hydrolyzed 1-alkylvinyl ester/vinyl ester copolymers after the polymerization and before the drying operation, for the production of polymer powders redispersible in water. DE-A 1026074 addresses the preparation of hydrolyzed 1-alkylvinyl ester/vinyl ester copolymers and their use as protective colloid in the context of the suspension polymerization or emulsion polymerization of ethylenically unsaturated monomers. EP-A 812863 describes the preparation of poly(meth) acrylic esters by polymerization in the presence of low molecular mass polyvinyl alcohols. Polymer powders obtainable therefrom have a tendency toward blocking. From EP-A 0723975 it is possible to find protective colloid-stabilized polymer powders based on polystyrene-acrylates containing epoxy groups. EP-A 2033991, EP-A 2075286, EP-A 2166028, EP-A 2189499, EP-A 2216348, and EP-A 1612226 teach polyvinyl alcohols containing glycol side groups as protective colloids for aqueous polymer dispersions and/or water-redispersible polymer powders.

Against this background, the object was to provide stable, protective colloid-stabilized dispersions and corresponding polymer powders redispersible in water, based on (meth) acrylic ester monomers, which when used in cementitious applications possess a completely satisfactory stability of viscosity or cement stability, and which do not hinder the setting of cement. Corresponding cementitious construction compounds ought, therefore, to have outstanding processing properties and to lead to buildings having very good mechanical properties, such as tensile adhesive strengths.

DESCRIPTION OF THE INVENTION

Surprisingly this object has been achieved by polymerization of acrylic esters and/or methacrylic esters by means of emulsion polymerization in the presence of a fully hydrolyzed 1-alkylvinyl ester/vinyl ester copolymer. This was surprising particularly in as much as fully hydrolyzed polyvinyl alcohols are not per se generally suitable for use as protective colloids in the stabilization of polymer dispersions. Generally, moreover, fully hydrolyzed 1-alkylvinyl ester/vinyl ester copolymers possess too high a hydrophilicity and, in association therewith, too low a lipophilicity to lead, when used as protective colloids for poly(meth)acrylic esters, to dispersions having sufficient polymer stability and cement stability. A difference in hydrophilicity is one of the reasons why data on vinyl esters cannot be transposed directly to (meth)acrylic esters. Furthermore, data on protective colloids for suspension polymerization processes cannot be transposed to emulsion polymerization processes, since these two processes proceed according to different mechanisms and, in conjunction with these mechanisms, produce polymers having quite different particle sizes, in turn imposing different requirements on the protective colloids. As a result of the process of the invention, however, poly(meth)acrylic esters are made available that achieve the object of the invention.

The invention provides processes for preparing protective colloid-stabilized polymers based on (meth)acrylate acid esters in the form of their aqueous dispersions and polymer powders redispersible in water, by means of radically initiated emulsion polymerization of one or more monomers from the group of the esters of acrylic acid or methacrylic acid and optionally one or more further monomers copolymerizable therewith, in the presence of one or more protective colloids, and optionally drying of the aqueous dispersion obtained thereby, characterized in that the emulsion polymerization is carried out in the presence of one or more fully hydrolyzed 1-alkylvinyl ester/vinyl ester copolymers as protective colloid.

The invention further provides protective colloid-stabilized polymers based on (meth)acrylate acid esters in the form of their aqueous dispersions and polymer powders redispersible in water, obtainable by means of radically initiated emulsion polymerization of one or more monomers from the group of the esters of acrylic acid or methacrylic acid and optionally one or more further monomers copolymerizable therewith, in the presence of one or more protective colloids, and optionally drying of the aqueous dispersion obtained thereby, characterized in that the emulsion polymerization is carried out in the presence of one or more fully hydrolyzed 1-alkylvinyl ester/vinyl ester copolymers as protective colloid.

Suitable monomers from the group of the esters of acrylic acid or methacrylic acid are, for example, esters of unbranched or branched alcohols having 1 to 15 C atoms. Preferred methacrylic esters or acrylic esters are methyl acrylate, methyl methacrylate, ethyl acrylate, ethyl methacrylate, propyl acrylate, propyl methacrylate, n-butyl acrylate, n-butyl methacrylate, and 2-ethylhexyl acrylate. Particularly preferred are methyl acrylate, methyl methacrylate, n-butyl acrylate, and 2-ethylhexyl acrylate.

The fraction of the esters of acrylic acid or methacrylic acid is preferably 45 to 100 wt %, more preferably 70 to 100 wt %, even more preferably 80 to 100 wt %, and most preferably 90 to 100 wt %, the figures in wt % being based in each case on the total weight of the monomers used overall in the emulsion polymerization. Most preferable of all are polymers which contain exclusively esters of acrylic acid or methacrylic acid as monomer units.

The methacrylic esters and acrylic esters may optionally be copolymerized with further monomers as well, as for example with one or more monomers from the group encompassing vinyl esters of unbranched or branched carboxylic acids having 1 to 12 C atoms, vinyl aromatics, vinyl halides, olefins, and dienes. Preferred further monomers are vinyl aromatics, vinyl halides, olefins, or dienes.

Preferred vinyl esters are vinyl acetate, vinyl propionate, vinyl butyrate, vinyl 2-ethylhexanoate, vinyl laurate, 1-methylvinyl acetate, vinyl pivalate, and vinyl esters of α-branched monocarboxylic acids having 9 to 11 C atoms, as for example VeoVa9® or VeoVa10® (trade names of Shell). Vinyl acetate is particularly preferred. Preferred vinyl aromatics are styrene, methylstyrene, and vinyl toluene. A preferred vinyl halide is vinyl chloride. The preferred olefins are ethylene, propylene, and the preferred dienes are 1,3-butadiene and isoprene.

The fraction of the further monomers is preferably 0 to 55 wt %, more preferably 0 to 30 wt %, even more preferably 0 to 15 wt %, and most preferably 0 to 5 wt %, the amounts in wt % being based in each case on the total weight of the monomers used overall in the emulsion polymerization.

Optionally it is also possible for 0.05 to 10 wt % of auxiliary monomers, based on the total weight of the monomer mixture, to be copolymerized. Examples of auxiliary monomers are ethylenically unsaturated monocarboxylic and dicarboxylic acids, preferably acrylic acid, methacrylic acid, fumaric acid, and maleic acid; ethylenically unsaturated carboxamides and carbonitriles, preferably acrylamide and acrylonitrile; monoesters and diesters of fumaric acid and maleic acid such as the diethyl and diisopropyl esters and also maleic anhydride, ethylenically unsaturated sulfonic acids and their salts, preferably vinylsulfonic acid and 2-acrylamido-2-methylpropane-sulfonic acid. Further examples are pre-crosslinking comonomers such as polyethylenically unsaturated comonomers, examples being divinyl adipate, diallyl maleate, allyl methacrylate, or triallyl cyanurate, or post-crosslinking comonomers, examples being acrylamidoglycolic acid (AGA), methylacrylamidoglycolic acid methyl ester (MAGME), N-methylolacrylamide (NMA), N-methylolmethacrylamide, N-methylolallylcarbamate, alkyl ethers such as the isobutoxy ether or esters of N-methylolacrylamide, of N-methylolmethacrylamide, and of N-methylolallylcarbamate. Also suitable are epoxide-functional comonomers such as glycidyl methacrylate and glycidyl acrylate. Further examples are silicon-functional comonomers, such as acryloyloxypropyltri(alkoxy)- and methacryloyloxypropyltri(alkoxy)-silanes, vinyltrialkoxysilanes, and vinylmethyldialkoxysilanes, with alkoxy groups that may be present being, for example, ethoxy and ethoxypropylene glycol ether radicals. Mention may also be made of monomers with hydroxyl or CO groups, examples being methacrylic and acrylic hydroxyalkyl esters such as hydroxyethyl, hydroxypropyl, or hydroxybutyl acrylate or methacrylate, and also compounds such as diacetoneacrylamide and acetylacetoxyethyl acrylate or methacrylate.

Most preferred are homopolymers and copolymers which comprise one or more monomers from the group of methyl acrylate, methyl methacrylate, ethyl acrylate, ethyl methacrylate, propyl acrylate, propyl methacrylate, n-butyl acrylate, n-butyl methacrylate, and 2-ethylhexyl acrylate, more particularly homopolymers of methyl acrylate, methyl methacrylate, n-butyl acrylate, or 2-ethylhexyl acrylate, or copolymers of methyl methacrylate with n-butyl acrylate and/or 2-ethylhexyl acrylate; and also styrene-acrylic ester copolymers with one or more monomers from the group of methyl acrylate, ethyl acrylate, propyl acrylate, n-butyl acrylate, and 2-ethylhexyl acrylate; vinyl acetate-acrylic ester copolymers with one or more monomers from the group of methyl acrylate, ethyl acrylate, propyl acrylate, n-butyl acrylate, 2-ethylhexyl acrylate, and, optionally, ethylene; the stated homopolymers and copolymers may optionally further comprise the abovementioned auxiliary monomers in the amounts stated above.

Under the process conditions of the invention it is possible for grafted, fully hydrolyzed 1-alkylvinyl ester/vinyl ester copolymers to form, in which polymers of one or more of the monomers used in accordance with the invention, more particularly one or more monomers from the group of the esters of acrylic acid or methacrylic acid, are grafted on fully hydrolyzed 1-alkylvinyl ester/vinyl ester copolymers. Instances of such grafting have been observed in the polymerization of methacrylic esters or acrylic esters in accordance with the invention, but not, for example, in the corresponding polymerization of exclusively vinyl esters or styrene.

The degree of grafting may be characterized by a grafting parameter. The degree of grafting is determined by applying an aqueous dispersion prepared by emulsion polymerization in a film thickness of 100 μm to a polyethylene terephthalate film (PET film) and then drying the applied film for 24 hours at 23° C. under a relative atmospheric humidity of 50% and a pressure of 1 atm, to form a film. Exactly 1 g (=weight a) of this film is immersed in succession, for 6 hours in each case, into hot methyl acetate at 50° C., then into hot water at 98° C., into hot toluene at 98° C., into hot water at 98° C., and finally into hot methyl ethyl ketone at 50° C., and the weight b of the dry solid remaining is ascertained. Additionally ascertained is the volatile fraction c of the film, in %. The degree of grafting is given by the a, b, and c values ascertained in this way, in accordance with the following formula (the symbols "×", "−", and "/" herein take on their customary definitions of multiplying, subtracting, and dividing, respectively):

degree of grafting (%)=[b/(a×(100−c)/100)]×100

The grafting parameter amounts preferably to 0 to 30%, more preferably 0.1 to 30%, and most preferably 0.1 to 15%.

The protective colloid-stabilized polymers have average particle diameters Dw of preferably 300 nm to 3 µm, more preferably 500 nm to 3 µm, very preferably 500 nm to 1.5 µm, and most preferably 700 nm to 1.5 µm (determined using the Beckmann Coulter® LS instrument in accordance with ISO 13320).

The monomer selection and the selection of the weight fractions of the comonomers are made such as to result in general in a glass transition temperature, Tg, of −30° C. to +40° C., preferably −25° C. to +30° C. The Tg glass transition temperature of the polymers may be determined in a known way by means of differential scanning calorimetry (DSC). The Tg may also be calculated approximately in advance using the Fox equation. According to Fox T. G., Bull. Am. Physics Soc. 1, 3, page 123 (1956):

$1/Tg=x_1/Tg_1+x_2/Tg_2+\ldots+x_n/Tg_n$, where $x_n$ stands for the mass fraction (wt %/100) of the monomer n, and $Tg_n$ is the glass transition temperature, in Kelvins, of the homopolymer of the monomer n. Tg values for homopolymers are listed in Polymer Handbook 2nd Edition, J. Wiley & Sons, New York (1975).

Preparation takes place by the emulsion polymerization process or else by miniemulsion polymerization processes, the polymerization temperature being in general 40° C. to 100° C., preferably 60° C. to 90° C. In the case of the copolymerization of gaseous comonomers such as ethylene, 1,3-butadiene, or vinyl chloride, it is also possible to operate under pressure, generally between 5 bar and 100 bar. The statements made below for the emulsion polymerization also relate to the miniemulsion polymerization processes.

The polymerization is initiated generally with the water-soluble or monomer-soluble initiators, or redox initiator combinations, that are customary for emulsion polymerization. Examples of water-soluble initiators are the sodium, potassium, and ammonium salts of peroxodisulfuric acid, hydrogen peroxide, tert-butyl peroxide, tert-butyl hydroperoxide, potassium peroxodiphosphate, tert-butyl peroxopivalate, cumene hydroperoxide, isopropylbenzene monohydroperoxide azobisisobutyronitrile. Examples of monomer-soluble initiators are dicetyl peroxydicarbonate, dicyclohexyl peroxydicarbonate, and dibenzoyl peroxide. The stated initiators are used generally in an amount of 0.001 to 0.02 wt %, preferably 0.001 to 0.01 wt %, based in each case on the total weight of the monomers.

Redox initiators used are combinations of the stated initiators in combination with reducing agents. Suitable reducing agents are the sulfites and bisulfites of the alkali metals and of ammonium, sodium sulfite for example, the derivatives of sulfoxylic acid such as zinc or alkali formaldehydesulfoxylates, sodium hydroxymethanesulfinate for example, tartrates, and ascorbic acid. The amount of reducing agent is generally 0.001 to 0.03 wt %, preferably 0.001 to 0.015 wt %, based in each case on the total weight of the monomers.

To control the molecular weight it is possible to use substances that regulate it during the polymerization. If such chain transfer agents are used, they are employed typically in amounts between 0.01 to 5.0 wt %, based on the monomers to be polymerized, and are metered in separately or else as a premix with reaction components. Examples of such agents are n-dodecyl mercaptan, tert-dodecyl mercaptan, mercaptopropionic acid, methyl mercaptopropionate, isopropanol, and acetaldehyde. Preferably no such agents are used.

It is essential to the invention that the emulsion polymerization is carried out in the presence of one or more fully hydrolyzed 1-alkylvinyl ester/vinyl ester copolymers.

Fully hydrolyzed 1-alkylvinyl ester/vinyl ester copolymers contain preferably 70 to 95 wt % of vinyl alcohol units and 5 to 30 wt % and more preferably 10 to 20 wt % of 1-alkylvinyl alcohol units with C1 to C4 alkyl groups. The fully hydrolyzed 1-alkylvinyl ester/vinyl ester copolymers contain preferably less than 5 wt % and more preferably less than 2 wt %, and most preferably less than 1 wt %, of 1-alkylvinyl ester units and vinyl ester units. The figures in wt % are based in each case on the total weight of the fully hydrolyzed 1-alkylvinyl ester/vinyl ester copolymers.

Particularly preferred 1-alkylvinyl ester units are 1-methylvinyl alcohol units.

The degree of hydrolysis of the fully hydrolyzed 1-alkylvinyl ester/vinyl ester copolymers is preferably 95 to 100 mol %, more preferably 96 to 100 mol %, even more preferably 98 to 100 mol %, and most preferably 99 to 100 mol %.

The Höppler viscosity of the fully hydrolyzed 1-alkylvinyl ester/vinyl ester copolymers is preferably 2 to 10 mPa·s and more preferably 2 to 4.0 mPa·s (determined in 4% strength aqueous solution at 20° C. in accordance with DIN 53015).

The emulsion polymerization is carried out preferably in the presence of 4 to 20 wt % and more preferably 6 to 13 wt % of fully hydrolyzed 1-alkylvinyl ester/vinyl ester copolymers, based in each case on the total weight of the monomers used overall in the emulsion polymerization.

Based on the total weight of the protective colloids used overall in the emulsion polymerization, the emulsion polymerization is carried out in the presence of preferably 20 to 100 wt %, more preferably 50 to 100 wt %, and most preferably 80 to 100 wt % of fully hydrolyzed 1-alkylvinyl ester/vinyl ester copolymers. Preferred most of all is the use exclusively, in the emulsion polymerization, of fully hydrolyzed 1-alkylvinyl ester/vinyl ester copolymers.

The fully hydrolyzed 1-alkylvinyl ester/vinyl ester copolymers are obtainable by copolymerization of vinyl acetate with one or more 1-alkylvinyl esters, more particularly isopropenyl acetate, and subsequent hydrolysis. The preparation is described in DE-A 3724332.

In the case of the processes of the invention, polymerization takes place preferably without addition of emulsifiers. In exceptional cases it may be an advantage to use small amounts of emulsifiers additionally, optionally 1 to 5 wt % based on the monomer amount. Suitable emulsifiers are anionic, cationic, and nonionic emulsifiers, examples being anionic surfactants, such as alkyl sulfates with a chain length of 8 to 18 C atoms, alkyl or alkylaryl ether sulfates with 8 to 18 C atoms in the hydrophobic radical and up to 40 ethylene oxide or propylene oxide units, alkyl- or alkylarylsulfonates having 8 to 18 C atoms, esters and monoesters of sulfosuccinic acid with monohydric alcohols or alkylphenols, or nonionic surfactants such as alkyl polyglycol ethers or alkylaryl polyglycol ethers having 8 to 40 ethylene oxide units.

The monomers may be included entirely in the initial charge or metered in entirely, or included in proportions in the initial charge, with the remainder of monomers being metered in after the polymerization has been initiated. The metered feeds may be carried out separately (in terms of location and of time), or some or all of the components to be metered may be metered in pre-emulsified form.

After the end of the polymerization, residual monomers can be removed by postpolymerization in application of known methods, as for example by postpolymerization initiated using redox catalyst. Volatile residual monomers may also be removed by means of distillation, preferably under reduced pressure, and optionally with inert entraining gases, such as air, nitrogen, or steam, being passed over or through the reaction mixture.

The aqueous dispersions obtainable with the process of the invention have a solids content of 30 to 75 wt %, preferably of 45 to 60 wt %.

To prepare the polymer powders redispersible in water, the aqueous dispersions, optionally following addition of protective colloids as a drying aid, are dried, by means of fluidized-bed drying, freeze drying, or spray drying, for example. The dispersions are preferably spray-dried. This spray drying takes place in customary spray-drying units, in which the atomization may take place by means of single-fluid, dual-fluid or multi-fluid nozzles or with a rotating disk. The exit temperature selected is generally in the range from 45° C. to 120° C., preferably 60° C. to 90° C., depending on the unit, resin Tg, and desired degree of drying.

Generally speaking, the drying aid is used in a total amount of 3 to 30 wt %, based on the polymeric constituents of the dispersion. This means that the total amount of protective colloid before the drying operation is to be at least 3 to 30 wt %, based on the polymer fraction; preference is given to using 5 to 20 wt %, based on the polymer fraction.

Examples of drying aids which can be used include fully hydrolyzed 1-alkylvinyl ester/vinyl ester copolymers, more particularly the abovementioned fully hydrolyzed 1-alkylvinyl ester/vinyl ester copolymers. Suitable atomizing aids, however, also include partly hydrolyzed polyvinyl alcohols; polyvinylpyrrolidones; polysaccharides in water-soluble form such as starches (amylose and amylopectin), celluloses and their carboxymethyl, methyl, hydroxyethyl, and hydroxypropyl derivatives; proteins such as casein or caseinate, soy protein, gelatin; lignosulfonates; synthetic polymers such as poly(meth)acrylic acid, copolymers of (meth)acrylates with carboxyl-functional comonomer units, poly(meth)acrylamide, polyvinylsulfonic acids, and water-soluble copolymers thereof; melamine-formaldehydesulfonates, naphthalene-formaldehydesulfonates, styrene-maleic acid and vinyl ether-maleic acid copolymers. As an atomizing aid it is preferred to use no further protective colloids than polyvinyl alcohols.

In the course of the atomization it has often proven useful to have an amount of up to 1.5 wt % of antifoam agent, based on the base polymer. To prolong the shelf life by improving the blocking stability, particularly in the case of powders with a low glass transition temperature, the resulting powder may be furnished with an antiblocking agent (anticaking agent), preferably at up to 30 wt %, based on the total weight of polymeric constituents. Examples of antiblocking agents are Ca or Mg carbonate, talc, gypsum, silica, kaolins, and silicates with particle sizes preferably in the range from 10 nm to 10 μm.

The viscosity of the feed to be atomized is set via the solids content so as to give a value of ≤500 mPas (Brookfield viscosity at 20 revolutions and 23° C.), preferably ≤250 mPas. The solids content of the dispersion to be atomized is ≥35%, preferably ≥40%.

To improve the performance properties it is possible to add other adjuvants in the course of atomization. Further constituents, present in preferred embodiments, in polymer powder compositions are, for example, pigments, fillers, foam stabilizers, and hydrophobizing agents.

The aqueous polymer dispersions and, preferably, the protective colloid-stabilized polymer powders redispersible in water, can be employed in the application sectors typical for them. For example, in chemical construction products in conjunction with hydraulically setting binders such as cements (Portland, aluminate, trass, blast furnace, magnesia, and phosphate cement), gypsum, waterglass, for producing building adhesives, renders, filling compounds, flooring compounds, sealing slurries, jointing mortars, and paints. Additionally, as sole binders for coating materials and adhesive-bonding materials, or as coating or binder materials for textiles and paper.

The polymers prepared in accordance with the invention are also suitable more particularly for chemical construction products with high binder content. The chemical construction products comprise preferably 0.5 to 80 wt %, more preferably 2 to 40 wt %, and most preferably 9 to 40 wt % of polymers in the form of aqueous dispersions or water-redispersible polymer powders. The formulas contain preferably 2 to 80 wt %, more preferably 2 to 40 wt %, and most preferably 4 to 35 wt % of hydraulically setting binders, such as cement, gypsum, or mixtures thereof; cement as hydraulically setting binder is preferred. Another constituent of the formulas is 5 to 80 wt % of inorganic fillers such as sand, finely ground quartz, chalk, finely ground limestone, filter ash, or mixtures thereof. To further improve the leveling properties it is possible for the dry mix to be admixed optionally with adjuvants that promote leveling, as well, such as casein or cement plasticizers. The data in wt % relate to the dry components and are always based on 100 wt % dry mass of the formula for the particular chemical construction product. The chemical construction product in its ready-to-use form is obtained, lastly, by admixing of water to the dry mix referred to above.

It was particularly surprising that through use of fully hydrolyzed 1-alkylvinyl ester/vinyl ester copolymers in the process of the invention, stable polymer dispersions and stable polymer powders, and also, furthermore, stable polymer-modified cementitious construction compounds, were obtainable. The reason is that fully hydrolyzed polyvinyl alcohols are naturally very hydrophilic and hence very water-soluble, and therefore poorly suited, generally, to use as protective colloids for stabilizing aqueous polymer dispersions or water-redispersible polymer powders. These statements are especially true of poly(meth)acrylic acid polymers specifically. Nevertheless, on the basis of the emulsion polymerization process of the invention, not only stable polymer dispersions and blocking-stable polymer powders, but also stable redispersions of the polymer powders of the invention are obtained. The polymers prepared in accordance with the invention are therefore dispersion-stable and, moreover, cement-stable. Furthermore, there is no unwanted gassing effect in the chemical construction products comprising the polymers stabilized in accordance with the invention. The construction compounds of the invention also display the desired performance properties, such as open time, and the buildings produced using them have the required mechanical properties, such as tensile adhesive strength.

The examples which follow serve for further elucidation of the invention:

Fully hydrolyzed 1-alkylvinyl ester/vinyl ester copolymer used in the examples:

PME:

Fully hydrolyzed copolymer of isopropenyl acetate and vinyl acetate with a degree of hydrolysis of ≥98% and a Höppler viscosity of 2.3 mPas (determined in 4% strength aqueous solution at 20° C. in accordance with DIN 53015), and with an isopropenyl acetate fraction of 20 mol %.

EXAMPLE 1

A stirrable autoclave (3 L) was charged with 491 g of deionized water, 360 g of an aqueous solution of PME (solids content 26%), and 293 g of n-butyl acrylate and 293 g of methyl methacrylate, with stirring. The initial charge was heated to 60° C., and, beginning at a temperature of 50° C., 2.5 ml of a 1 wt % strength aqueous solution of iron ammonium sulfate and 54 g of a 10 wt % strength aqueous solution of disodium tartrate were added over 5 minutes. When the temperature was at 60° C., 211 g of a 1 vol % strength hydrogen peroxide solution were metered in over a period of 300 minutes. 20 minutes after attainment of a temperature of 60° C., a monomer mixture consisting of 293 g of n-butyl acrylate and 293 g of methyl methacrylate was metered in over 180 minutes. Additionally, 80 minutes after attainment of a temperature of 60° C., 90 g of an aqueous solution of PME (solids content 26%) and 159 g of water were metered in. After the end of the metering of the hydrogen peroxide solution, the batch was held at 60° C. for 60 minutes more. Postpolymerization took place at 45° C. with addition of 10 g of tert-butyl hydroperoxide (10 wt % strength) and 20 g of Brüggolit (10 wt % strength).

The resulting dispersion had a solids content of 51%, and analysis of the particle size distribution yielded a particle size diameter Dw of 1 µm (Coulter LS 13320). The pH was 7.0 and the viscosity was 350 mPas (determined using a Brookfield viscometer at 23° C. and 20 rpm with spindle 2). The degree of grafting was 7% (determination as indicated earlier on above in the description).

EXAMPLE 2

A stirrable autoclave (3 L) was charged with 373 g of deionized water, 352 g of an aqueous solution of PME (solids content 26%), and 155 g of n-butyl acrylate and 155 g of methyl methacrylate. The initial charge was heated to 70° C., and 3 ml of a 1 wt % strength aqueous solution of iron ammonium sulfate were added. When the temperature was at 70° C., the metered addition was commenced of a 1 wt % strength tert-butyl hydroperoxide solution and of a 1.5 wt % strength Brüggolit solution (sodium hydroxymethanesulfinate), using the following metering rates in succession: 15 minutes each at a metering rate of 12 g/h, then 165 minutes each at a metering rate of 3 g/h, 180 minutes each at a metering rate of 10 g/h, and, finally, the metering rate was raised to 20 g/h over the course of 60 minutes and continued at that metering rate for 60 minutes. 5 minutes after the temperature had reached 70° C., the metered addition was commenced of 302 g of n-butyl acrylate and 302 g of methyl methacrylate, which were metered in at a uniform rate over 210 minutes. 30 minutes after the end of the metering of the butyl hydroperoxide solution and of the Brüggolit solution, the batch was cooled to room temperature. Postpolymerization took place at 45° C. with 6 g of tert-butyl hydroperoxide (10% strength) and 12 g of Brüggolit (10% strength).

The resulting dispersion had a solids content of 53% and particle size diameter Dw of 1.2 µm (Coulter LS 13320). The pH was 4.3 and the viscosity was 73 mPas (determined using a Brookfield viscometer at 23° C. and 20 rpm, with spindle 2). The degree of grafting was 7% (determination as indicated earlier on above in the description).

EXAMPLE 3 (COMPARATIVE)

A stirrable autoclave (3 L) was charged with 298 g of deionized water, 465 g of a 20 wt % strength aqueous solution of a partly hydrolyzed polyvinyl alcohol (degree of hydrolysis 88%, Höppler viscosity of 4 mPas), and 155 g of n-butyl acrylate and 155 g of methyl methacrylate. The initial charge was heated to 70° C., and 3 ml of a 1 wt % strength aqueous solution of iron ammonium sulfate were added during this heating. When the temperature was at 70° C., the metered addition was commenced of a 1 wt % strength tert-butyl hydroperoxide solution and of a 1.5 wt % strength Brüggolit solution (sodium hydroxymethanesulfinate), using the following metering rates in succession: 15 minutes each at a metering rate of 12 g/h, then 165 minutes each at a metering rate of 3 g/h, 180 minutes each at a metering rate of 10 g/h, and, finally, the metering rate was raised to 20 g/h over the course of 60 minutes and continued at that metering rate for a further 60 minutes. 5 minutes after the temperature had reached 70° C., 302 g of n-butyl acrylate and 302 g of methyl methacrylate were metered in at a uniform rate over 210 minutes. 30 minutes after the end of the metering of the butyl hydroperoxide solution and of the Brüggolit solution, the batch was cooled down. Postpolymerization took place at 45° C. with 6 g of tert-butyl hydroperoxide (10% strength) and 12 g of Brüggolit (10% strength).

The resulting dispersion had a solids content of 53% and a particle size diameter Dw of 0.6 µm (Coulter LS 13320). The pH was 3.2 and the viscosity was 926 mPas (determined using a Brookfield viscometer at 23° C. and 20 rpm, with spindle 2).

EXAMPLE 4

400 parts by weight of the dispersion from Example 1 were admixed with 60 parts by weight of an aqueous solution of PME (solids content 20%) and 20 parts by weight of a partly hydrolyzed polyvinyl alcohol (solids content 10%), 0.4 parts by weight of defoamer, and 75 parts by weight of water, and these components were mixed thoroughly. The dispersion was sprayed through a two-fluid nozzle. The atomizing component used was 4 bar compressed air, and the droplets formed were dried in a cocurrent stream of air heated at 125° C. The dry polymer powder obtained was admixed with 12 wt % of commercial antiblocking agent (mixture of calcium carbonate and kaolin).

Performance Testing:

The stability of the polymer dispersion in cementitious construction compounds was tested using the formula according to Table 1.

TABLE 1

| Formula of the construction compound: | |
| --- | --- |
| Amount | Raw materials |
| 82.5 g | Portland cement |
| 75 g | Calcite (CaCO$_3$) (10-40 mm) |
| 142 g | Vitreous silica (200-500 mm) |
| 14.5 g | Polymer dispersion[x)] |
| 85 g | Water |

[x)]The amount used is based on the dry mass of the respective dispersion.

The constituents of the formula according to Table 1 were combined and mixed uniformly for a minute with the dissolver at 1000 rpm. The mixture was then left to stand for a minute. It was then agitated at 150 rpm for 15 seconds, using an anchor stirrer. This was followed immediately by measurement with the Viscotester VT 181 with T spindle measuring system on setting 1 for 15 seconds. The scale value read off on the Viscotester was defined as the starting value of 100%. The scale value measured after 1 hour was expressed in relation to the starting value. The results of measurement of the cement compatibility determined in this way are entered in Table 2.

TABLE 2

Cement compatibility of polymer dispersions in construction compounds according to Table 1:

| Polymer dispersion | Cement stability |
|---|---|
| Example 1 | 120% |
| Example 2 | 135% |
| Example 3 (comparative) | 200% |

The polymer dispersion of the comparative example, Example 3, gave a viscosity increase of 200% on testing, and is therefore far from being cement-stable. The inventive examples, in contrast, feature very good cement stability.

Polymer powders were tested in the tile adhesive formulation according to Table 3.

TABLE 3

Tile adhesive formulation:

| Amount | Raw materials |
|---|---|
| 300 | Portland CEM I/Milke 52.5 |
| 5 | Lime hydrate |
| 6 | Calcium formate |
| 583 | Quartz |
| 3 | Phyllosilicate |
| 3 | Cellulose fiber |
| 100 | Polymer powder |

Determinations were made of the open time to EN 1346, and the tensile adhesion test to EN 1348. The results are recorded in Table 4. The inventive powder features outstanding processing with a very long pot life. This is complemented by a very long open time and by improved tensile adhesive strengths after water storage and heat storage.

TABLE 4

Results of testing of polymer powders in tile adhesive formulations according to Table 3:

| | | Tensile adhesive strength | |
|---|---|---|---|
| Polymer powder | Open time after 30 min [N/mm²] | Water storage B [N/mm²] | Heat storage C [N/mm²] |
| VAC/E[a] | 1.3 | 0.7 | 2.5 |
| ST/BA[a] | 0.5 | 1.1 | 2.2 |
| MMA/BA/St[a] | 0.6 | 1.0 | 2.4 |
| Example 4 | 2.2 | 1.5 | 3.1 |

[a]Water-redispersible polymer powders stabilized exclusively with partly hydrolyzed polyvinyl alcohol:
VAC/E: Polymer powder based on vinyl acetate and ethylene;
ST/BA: Polymer powder based on styrene and butyl acrylate;
MMA/BA/St: Polymer powder based on methyl methacrylate, butyl acrylate and styrene.

The invention claimed is:

1. A process for preparing protective colloid-stabilized polymers based on (meth)acrylate acid esters, said process comprising:
   conducting radically initiated emulsion polymerization of at least one monomer selected from the group consisting of acrylic acid esters and methacrylic acid esters, and optionally at least one further monomer copolymerizable therewith,
   wherein the acrylic acid esters and the methacrylic acid esters constitute 45 to 100 wt % based on a total weight of monomers used overall in the radically initiated emulsion polymerization,
   wherein the emulsion polymerization is carried out in the presence of at least one protective colloid including at least one fully hydrolyzed 1-alkylvinyl ester/vinyl ester copolymer having a degree of ester hydrolysis of 96 to 100 mol %, such that the protective colloid-stabilized polymers comprise the at least one monomer grafted on the at least one fully hydrolyzed 1-alkylvinyl ester/vinyl ester copolymer,
   wherein the at least one further monomer is a member selected from the group consisting of vinyl esters of unbranched or branched carboxylic acids having 1 to 12 C atoms, vinyl aromatics, vinyl halides, ethylene and propylene,
   wherein the emulsion polymerization is conducted in water and provides an aqueous dispersion of the protective colloid-stabilized polymers, and
   optionally drying of the aqueous dispersion to obtain a polymer powder redispersible in water.

2. The process for preparing protective colloid-stabilized polymers as claimed in claim 1, wherein at least one ester of acrylic acid or methacrylic acid is selected from the group consisting of methyl acrylate, methyl methacrylate, ethyl acrylate, ethyl methacrylate, propyl acrylate, propyl methacrylate, n-butyl acrylate, n-butyl methacrylate, and 2-ethylhexyl acrylate.

3. The process for preparing protective colloid-stabilized polymers as claimed in claim 1, wherein the at least one fully hydrolyzed 1-alkylvinyl ester/vinyl ester copolymer contains 70 to 95 wt % of vinyl alcohol units and 10 to 20 wt % of 1-alkylvinyl alcohol units with C1 to C4 alkyl groups.

4. The process for preparing protective colloid-stabilized polymers as claimed in claim 1, wherein the at least one fully hydrolyzed 1-alkylvinyl ester/vinyl ester copolymer contains less than 2 wt% of 1-alkylvinyl ester units and vinyl ester units, based on a total weight of the at least one fully hydrolyzed 1-alkylvinyl ester/vinyl ester copolymer.

5. The process for preparing protective colloid-stabilized polymers as claimed in claim 1, wherein the degree of ester hydrolysis of the at least one fully hydrolyzed 1-alkylvinyl ester/vinyl ester copolymer is 98 to 100 mol %.

6. The process for preparing protective colloid-stabilized polymers as claimed in claim 1, wherein a Höppler viscosity of the at least one fully hydrolyzed 1-alkylvinyl ester/vinyl ester copolymer is 2 to 10 mPa.s (determined in 4% strength aqueous solution at 20° C. in accordance with DIN 53015).

7. The process for preparing protective colloid-stabilized polymers as claimed in claim 1, wherein the emulsion polymerization is carried out in the presence of 4 to 20 wt % of the at least one fully hydrolyzed 1-alkylvinyl ester/vinyl ester copolymer, based on a total weight of the monomers used overall in the emulsion polymerization.

8. The process for preparing protective colloid-stabilized polymers as claimed in claim 1, wherein the emulsion polymerization is carried out in the presence of 20 to 100 wt % of the at least one fully hydrolyzed 1-alkylvinyl ester/vinyl ester copolymer, based on a total weight of the protective colloids used overall in the emulsion polymerization.

9. Protective colloid-stabilized polymers based on (meth)acrylate acid esters in a form of an aqueous dispersion or a polymer powder redispersible in water, obtainable by the process of claim 1.

10. The protective colloid-stabilized polymers as claimed in claim 9, wherein the protective colloid-stabilized polymers comprise fully hydrolyzed 1-alkylvinyl ester/vinyl ester copolymers on which are grafted the at least one monomer with a grafting parameter of 0.1 to 30%.

11. The process for preparing protective colloid-stabilized polymers as claimed in claim 2, wherein the at least one fully hydrolyzed 1-alkylvinyl ester/vinyl ester copolymer contains less than 2 wt % of 1-alkylvinyl ester units and vinyl ester units, based on a total weight of the at least one fully hydrolyzed 1-alkylvinyl ester/vinyl ester copolymer.

12. The process for preparing protective colloid-stabilized polymers as claimed in claim 11, wherein the degree of ester hydrolysis of the at least one fully hydrolyzed 1-alkylvinyl ester/vinyl ester copolymer is 98 to 100 mol %.

13. The process for preparing protective colloid-stabilized polymers as claimed in claim 12, wherein a Höppler viscosity of the at least one fully hydrolyzed 1-alkylvinyl ester/vinyl ester copolymer is 2 to 10 mPa.s (determined in 4% strength aqueous solution at 20° C. in accordance with DIN53015).

14. The process for preparing protective colloid-stabilized polymers as claimed in claim 13, wherein the emulsion polymerization is carried out in the presence of 4 to 20 wt % of the at least one fully hydrolyzed 1-alkylvinyl ester/vinyl ester copolymer, based on a total weight of the monomers used overall in the emulsion polymerization.

15. The process for preparing protective colloid-stabilized polymers as claimed in claim 14, wherein the emulsion polymerization is carried out in the presence of 20 to 100 wt % of the at least one fully hydrolyzed 1-alkylvinyl ester/vinyl ester copolymer, based on a total weight of the protective colloids used overall in the emulsion polymerization.

16. The protective colloid-stabilized polymers as claimed in claim 9, wherein the protective colloid-stabilized polymers comprise fully hydrolyzed 1-alkylvinyl ester/vinyl ester copolymers containing 70 to 95 wt % of vinyl alcohol units and 10 to 20 wt % of 1-alkylvinyl alcohol units with C1 to C4 alkyl groups.

17. The process for preparing protective colloid-stabilized polymers as claimed in claim 1, wherein the protective colloid-stabilized polymers comprise fully hydrolyzed 1-alkylvinyl ester/vinyl ester copolymers on which are grafted the at least one monomer with a grafting parameter of 0.1 to 30%.

18. The protective colloid-stabilized polymers as claimed in claim 9, wherein the at least one further monomer is polymerized in the radically initiated emulsion polymerization conducting step and is a member selected from the group consisting of vinyl aromatics, vinyl halides, olefins, dienes, ethylenically unsaturated monocarboxylic acids, ethylenically unsaturated dicarboxylic acids, ethylenically unsaturated carboxamides, ethylenically unsaturated carbonitriles, monoesters of fumaric acid, diesters of fumaric acid, monoesters of maleic acid, diesters of maleic acid, ethylenically unsaturated sulfonic acids and their salts, divinyl adipate, diallyl maleate, allyl methacrylate, triallyl cyanurate, acrylamidoglycolic acid, methylacrylamidoglycolic acid methyl ester, N-methylolacrylamide, N-methylolmethacrylamide, N-methylolallylcarbamate, isobutoxy ether of N-methylolacrylamide, isobutoxy esters of N-methylolacrylamide, isobutoxy ether of N-methylolmethacrylamide, isobutoxy esters of N-methylolmethacrylamide, isobutoxy ether of N-methylolallylcarbamate, isobutoxy esters of N-methylolallylcarbamate, glycidyl methacrylate, glycidyl acrylate, acryloyloxypropyltri(alkoxy)-silanes, methacryloyloxypropyltri-(alkoxy)-silanes, vinyltrialkoxysilanes, vinylmethyldialkoxysilanes, hydroxyethyl acrylate, hydroxyethyl methacrylate, hydroxypropyl acrylate, hydroxypropyl methacrylate, hydroxybutyl acrylate, hydroxybutyl methacrylate, diacetoneacrylamide, acetylacetoxyethyl acrylate and acetylacetoxyethyl methacrylate.

19. The process for preparing protective colloid-stabilized polymers as claimed in claim 1, wherein the at least one further monomer is polymerized in the radically initiated emulsion polymerization conducting step and is a member selected from the group consisting of vinyl aromatics, vinyl halides, olefins, dienes, ethylenically unsaturated monocarboxylic acids, ethylenically unsaturated dicarboxylic acids, ethylenically unsaturated carboxamides, ethylenically unsaturated carbonitriles, monoesters of fumaric acid, diesters of fumaric acid, monoesters of maleic acid, diesters of maleic acid, ethylenically unsaturated sulfonic acids and their salts, divinyl adipate, diallyl maleate, allyl methacrylate, triallyl cyanurate, acrylamidoglycolic acid, methylacrylamidoglycolic acid methyl ester, N-methylolacrylamide, N-methylolmethacrylamide, N-methylolallylcarbamate, isobutoxy ether of N-methylolacrylamide, isobutoxy esters of N-methylolacrylamide, isobutoxy ether of N-methylolmethacrylamide, isobutoxy esters of N-methylolmethacrylamide, isobutoxy ether of N-methylolallylcarbamate, isobutoxy esters of N-methylolallylcarbamate, glycidyl methacrylate, glycidyl acrylate, acryloyloxypropyltri(alkoxy)-silanes, methacryloyloxypropyltri-(alkoxy)-silanes, vinyltrialkoxysilanes, vinylmethyl-dialkoxysilanes, hydroxyethyl acrylate, hydroxyethyl methacrylate, hydroxypropyl acrylate, hydroxypropyl methacrylate, hydroxybutyl acrylate, hydroxybutyl methacrylate, diacetoneacrylamide, acetylacetoxyethyl acrylate and acetylacetoxyethyl methacrylate.

20. The process for preparing protective colloid-stabilized polymers as claimed in claim 1, which is free of chain transfer agents.

* * * * *